Patented June 3, 1947

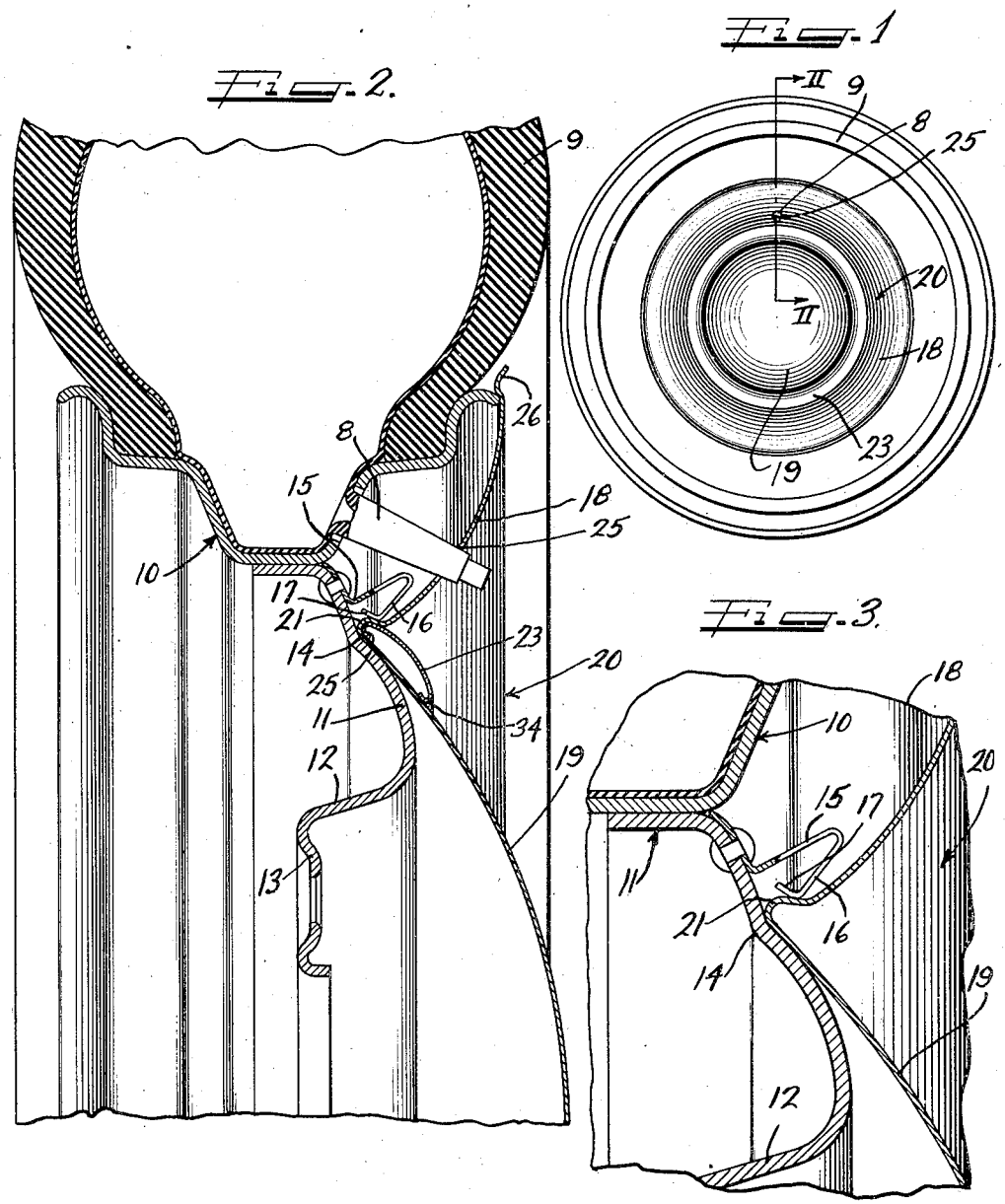

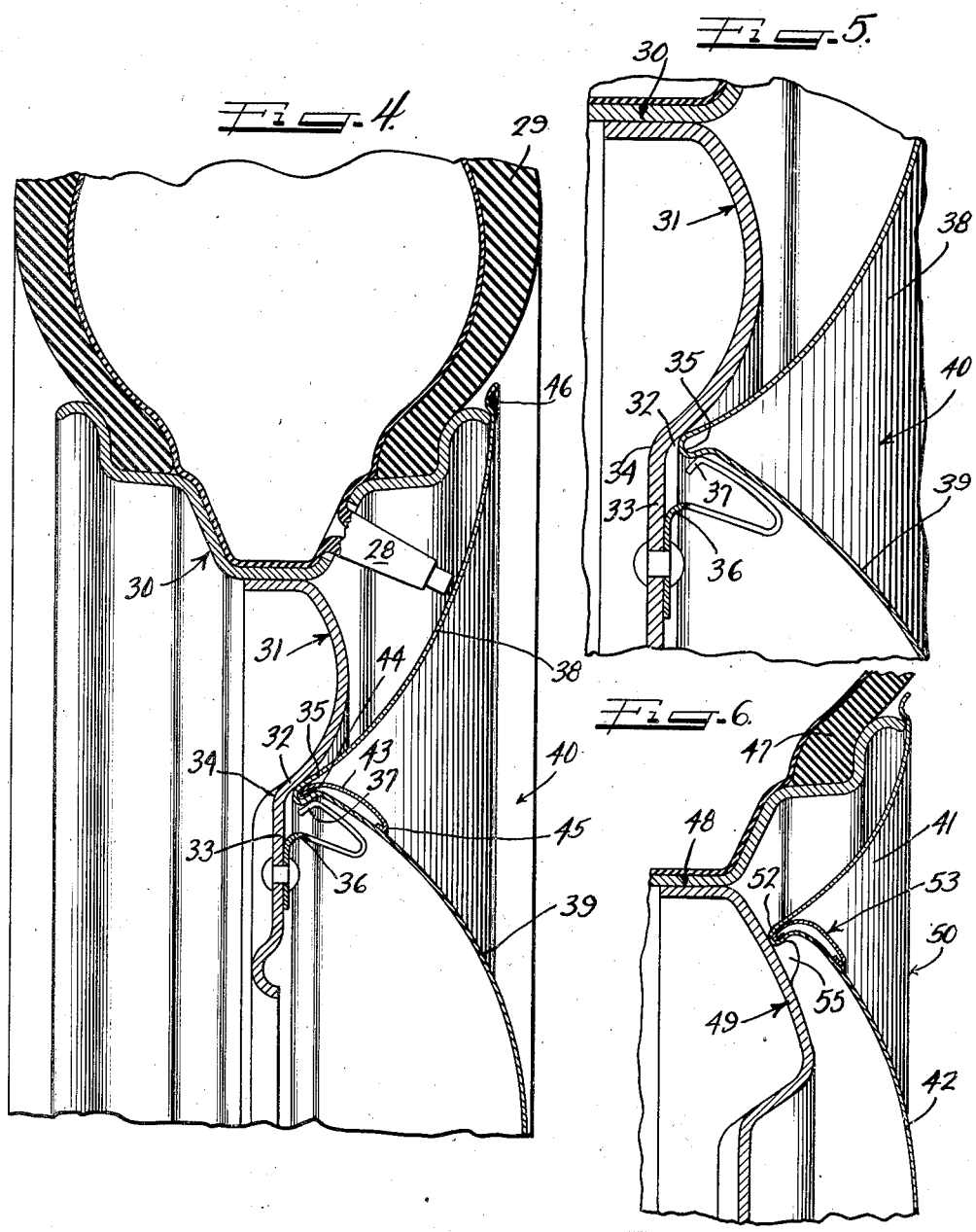

2,421,385

UNITED STATES PATENT OFFICE 2,421,385

WHEEL COVER

George Albert Lyon, Allenhurst, N. J.

Application April 17, 1944, Serial No. 531,336

7 Claims. (Cl. 301—37)

1

This invention relates to a wheel structure and more particularly to a wheel cover for the outwardly disposed side of an automobile wheel.

An object of this invention is to provide a simplified form of wheel cover which may be made of thin plastic sheet material which is self-sustaining as to shape and yet flexible, and which, by reason of its inherent characteristics, can be automatically adjusted to better fit the wheel.

In the manufacture of automobile wheels, it is the practice to allow considerable manufacturing tolerance with reference to the rim and body parts of the wheel. This is particularly true with regard to the relative axial positions of the rim and body parts of the wheel. For example, the position of the outer surface of the wheel body part may vary considerably with respect to the position of the outer edge of the rim. Accordingly it follows that a cover which must bridge the gap between the parts must bear against both of them, and must be able to adjust itself to variations in the locations of these parts if a tight fit is to be obtained of the cover on the wheel.

Accordingly, it is an object of this invention to provide a plastic wheel cover which by the act of detachably securing the same on the wheel, automatically adjusts the cover to the contour and the location of the rim and body parts of the wheel.

Still another object of this invention is to provide a unique and novel but simple way of attaching the wheel cover to a wheel.

A further object of this invention is to provide a wheel structure wherein a cover may be easily attached to or removed from the wheel, as desired.

In accordance with the general features of this invention there is provided a wheel cover including inner and outer portions joined by an intermediate portion manually flexible in its attachment to the wheel so that the intermediate portion may be tightly held against one of the wheel parts.

In accordance with other features of this invention there is provided a wheel structure having tire rim and body parts, a circular wheel cover therefor, of flexible plastic material which is form sustaining and yet deflectable without permanent deformation; the cover having concentric, concave, convex portions connected by a flexible indentation in which there is provided a retaining ring pressed into the indentation for deflecting the material at the indentation to shape and fit the cover so that it will accommo-

2 date variations in the wheel at its place of attachment to the wheel.

Other objects and features of this invention will more fully appear from the following detailed description taken in connection with the accompanying drawings which illustrate several embodiments thereof, and in which:

Figure 1 is a side view of a wheel structure embracing the features of this invention;

Figure 2 is an enlarged fragmentary cross-sectional view taken on substantially the line II—II of Figure 1 looking in the direction indicated by the arrows and showing clearly how my novel cover is retained on the wheel;

Figure 3 is an enlarged fragmentary cross-sectional view corresponding to a portion of Figure 2 showing the cover in a position to be retained on the wheel but prior to the application of the retaining ring thereto;

Figure 4 is an enlarged fragmentary cross-sectional view similar to Figure 2 but illustrating a modification of the invention;

Figure 5 is an enlarged fragmentary cross-sectional view similar to Figure 3, corresponding to a part of Figure 4 and showing the condition of the cover prior to the introduction of the retaining ring therein; and Figure 6 is an enlarged fragmentary cross-sectional view of a still further modification of the invention wherein bumps on the wheel are utilized to hold the cover on the wheel instead of spring clips, as in the other two forms in the drawings.

The reference character 9 designates generally a tire which is mounted on a conventional drop center tire rim 10 and which is in turn carried on a load bearing or body part 11. These two parts of the wheel may be attached together in any suitable manner as by means of welding, rivets or the like. The body part 11, which is a stamping, has a centrally depressed portion 12 terminating in a bolt-on flange 13 by means of which the wheel may be attached in the usual way by bolts or cap screws (not shown) to a part on the axle of the wheel. The body part 11 also has a slightly depressed portion forming a shoulder 14 which is cooperable with the cover.

Located between the shoulder 14 and the rim 10 is a plurality of spring clips 15 arranged in a common circle for retaining cooperation with the wheel cover of my invention.

The spring clips 15 may be of any suitable number, such, for example, as three or four, and each embraces a gooseneck flexible portion 16 terminating in an inclined shoulder portion 17.

It is over the shouldered end portions 17 of the clips that the cover is adapted to be cammed when it is pressed axially home into retained position.

The cover of my invention is designated generally by the reference character 20 and includes concentric convex concave portions 18 and 19 joined together at their rear extremities by an indented portion 21. These three portions, 18, 21 and 19, are all integral and may be made of suitable sheet material such, for example, as resilient plastic material which has sufficient body to be self-sustaining as to form and yet being resiliently deflectable without permanent deformation. In all forms of the invention herein described excellent results may be obtained by making the covers thereof of a plastic material such, for example, as ethyl cellulose. Any suitable apparatus may be employed for fabricating these covers from plastic sheets.

The cover 20, as is true of all of the other forms herein described, in reality embraces an outer annulus 18 terminating in a hub-cap simulating portion 19; the outer annulus being of such curvature and radial depth as to extend substantially clear up to the side wall of the tire 9 whereby it may appear to be a continuation of the side wall of the tire. For illustration, in any one of the forms of my invention, the outer annulus of the cover may be given a white external finish which causes the adjoining tire to appear to extend clear down to the central hub cap simulating portion. This results in the outer annular part of the cover appearing to be a part of the side wall of the tire, thereby giving the tire the appearance of being a massive one. A highly ornamental effect may be obtained by this structure, particularly if the outer annulus is finished in one color and the central hub cap simulating portion is finished in another. The color contrast may be accentuated by using a retaining ring, to be hereinafter described, having a lustrous external finish.

The outer annular portion 18 has its outer margin formed into a slightly turned edge 26 adapted to overhang the outer edge of the rim in close proximity to the tire. This enables the outer margin of the portion 18 to tightly hug and bear against the rim part of the wheel.

In applying this cover 20 to the wheel, as best shown in Figure 3, it is pressed axially against the wheel until indented portion 21 is snapped over the shouldered end extremities of the spring clips 15, the spring clips 15 being resilient to permit of the indentation 21 riding over or of being cammed over the humps on the spring clips. When in this position, as shown in Figure 3, the cover is temporarily retained on the clips in a centered condition preparatory to the application of the retaining ring 23 shown in Figure 2.

It should be noted at this time, as pointed out heretofore, that there is considerable variation in the relative location of the rim and body parts of the wheel due to the allowable manufacturing tolerances. As a consequence, when the indented portion 21 is in the position as shown in Figure 3 it may or may not be in contact with the body part. I find it desirable to shape or fit this portion 21 of the cover to the wheel in the act of applying the retaining ring 23 thereto.

The retaining ring 23 is of a hollow metallic construction and has inner and outer turned edges 24 and 25. As noted before, this ring, as is true of all the forms of this invention, may be given a lustrous external finish, such as by using stainless steel or by chrome plating the same.

The ring is preferably an endless one and is applied by pressing it axially into the indentation 21 of the cover 20. Due to the fact that this ring has greater rigidity than the material of the cover, the act of springing it in the indentation and behind the shoulder portion 17 of the spring clip results in its slightly deflecting or deforming the indented portion 21 of the cover. The deformation of the indented portion 21, however, is very slight, as will be seen from a comparison of Figures 2 and 3. In any event, this indented portion 21 is so acted upon as to cause it to tightly conform to the external shape of the wheel body at the shoulder 14 so that a very tight contact is established at that point behind the shouldered ends 17 of the clips. The spring clips 15 are so inclined that they exert a wedge-like action on the indented portion 21 whereby the cover and its ring 23 is retained in position on the wheel.

It will also be perceived, from Figure 2, that if it is so desired the valve stem 8 may extend through an aperture 25 in the annular portion 18 of the cover so as to be accessible without necessitating disturbance of the cover. As shown in Figure 4, however, the valve stem 28 may be wholly behind the cover portion, if it is so desired, in which event access may be had to it by flexing the outer portion of the cover away from the wheel.

In this first described form of the invention as well as in the other forms hereinafter described, the cover may be removed by manually flexing the outer annular portion of the cover away from the wheel to an extent sufficient to permit the introduction of a screwdriver therebehind so that the end of the screwdriver may be applied directly to the indented portion 21 for the purpose of forcibly ejecting the cover and the ring out of retained cooperation with the spring clips. Due to the fact that the indented portion 21 is fully backed up by the curved end 25 of the ring or bead 23, a reenforcement is provided at this portion of the cover for resisting damage by the pry-off force.

Furthermore, I desire to call attention to the fact that in all forms of my invention the flexibility of the material of the cover enables the outer portion 18 to be manually flexed slightly away from the cover for the purpose of affording access to the rear side thereof. Such access may be desirable where it becomes necessary to adjust wheel balancing weights or the like, which might be carried by the wheel, in a manner well known to those familiar with this art. Moreover, access may be desirable where the valve stem is wholly behind the cover, as is shown in Figure 4.

Attention is further directed to the fact that upon release of the deflected portion of the cover, it immediately springs back against the outer edge of the rim so that a tight contact is insured.

In Figures 4 and 5 I have illustrated a modification of the invention wherein the principal difference resides in the location of the spring clip retaining means. In this form of the invention the tire 29 is carried on the usual drop-center rim 30, through one of the flanges of which extends the valve stem 28 for the inner tube of the tire.

The rim 30 is carried upon a load-bearing or body part 31 having a depressed central section 34 provided with a base flange 33 by means of which the wheel may be attached in the usual way by cap screws or bolts (not shown) to a part on the axle of the wheel. The depressed portion 34 has a shouldered portion 32 against which my cover is adapted to bear when mounted on the wheel.

The cover of this form of the invention is designated generally by the reference character 40 and includes a relatively deep outer annular portion 38 and a central hub cap simulating portion 39, both of which portions, as is true in the other forms of my invention, are concentric. These two portions 38 and 39, as best shown in Figure 5, are connected together by an indented portion 35 cooperable with spring clips 36 mounted on the central flange portion 33 of the wheel body part. These spring clips are substantially the same as the previously described clips and each includes a goose neck terminating in a shouldered extremity 37 for wedgingly holding the cover assembly on the wheel.

The depressed portion 35 is cooperable with a hollow metallic retaining ring 43 having turned outer and inner extremities 44 and 45.

The form of cover assembly above described is applied to and removed from the wheel in much the same manner as the previously described embodiment. It differs from the previously described embodiment in that the spring clips are disposed inside of the central hub cap simulating portion 39 instead of behind the outer annular portion as in Figure 2. It also differs from the first form of the invention in that the valve stem, as previously noted, is fully concealed by the flexible outer annular portion 38 of the cover.

Removal of the cover may be effected by pulling the turned outer edge 46 of the annular portion 38 slightly away from the wheel so that a screwdriver may be inserted behind the portion 38 to apply a pry-off force directly to the indented intermediate portion of the cover.

In Figure 6 I have illustrated a modification of the invention which is very similiar to the one shown in Figure 4 except that protuberance means is employed for retaining the cover assembly on the wheel instead of spring clips.

In this form of the invention the tire 47 is mounted on a drop-center rim part 48 carried by a body portion 49 having secured to its outer surface or formed integral therewith a plurality of spaced protuberances 55. These protuberances are of a character now well known in the art and are arranged in a common circle. Each of them has a shouldered outer extremity over which an intermediate portion of the cover is adapted to be wedgingly sprung to retain the cover on the wheel.

The cover of this form of the invention is designated by the reference character 50 and includes circular portions 41 and 42, the latter being a hub cap simulating portion. These two portions 41 and 42 are connected by an indented intermediate portion 52 in which a snap-on ring 53 is pressed to shape the intermediate portion to the configuration of the protuberances 55 and to retain the cover on the wheel.

The application to and removal of this cover with respect to the wheel is substantially the same as in the other embodiments of the invention.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In a wheel structure including a wheel having tire rim and body parts with the body part provided with outwardly projecting cover retaining means, a circular wheel cover therefor of flexible material which is form-sustaining and yet deflectable without permanent deformation, said cover having concentric portions joined by a flexible indentation and a retaining ring pressed into said indentation for deflecting the material at the indentation to shape and fit the cover and accommodate manufacturing variations in the tire rim and body parts and to force said indentation into engagement with the retaining means on the body part of the wheel.

2. In a wheel structure including a wheel having tire rim and body parts with the body part provided with outwardly projecting cover retaining means, a circular wheel cover therefor of flexible material which is form-sustaining and yet deflectable without permanent deformation, said cover having inner and outer portions joined by an intermediate portion resiliently deflectable in the retention of the cover on the wheel, the outer portion being formed to bear against the outer edge of the rim part and the intermediate portion being arranged to be brought into contact with the body part of the wheel adjacent the retaining means, and a ring mounted in said intermediate portion for forcing and deflecting the same into contact with the wheel body part and also into retaining cooperation with the retaining means on the wheel.

3. In a wheel structure including a wheel having tire rim and body parts with the body part provided with outwardly projecting cover retaining means, a circular wheel cover therefor of flexible material which is form sustaining and yet deflectable without permanent deformation, said cover having inner and outer portions joined by an intermediate portion resiliently deflectable in the retention of the cover on the wheel, the outer portion being formed to bear against the outer edge of the rim part and the intermediate portion being arranged to be brought into contact with the body part of the wheel adjacent the retaining means, and a ring mounted in said intermediate portion for forcing and deflecting the same into contact with the wheel body part and also into retaining cooperation with the retaining means on the wheel, said retaining means on the wheel being in the form of a plurality of spring clips arranged in a common circle and extending into the interior of the inner portion of the cover.

4. In a wheel structure including a wheel having tire rim and body parts with the body part provided with outwardly projecting cover retaining means, a circular wheel cover therefor of flexible material which is form sustaining and yet deflectable without permanent deformation, said cover having concentric portions joined by a flexible indentation and a retaining ring pressed into said indentation for deflecting the material at the indentation to shape and fit the cover and accommodate manufacturing variations in the wheel body parts and to force said indentation into engagement with the retaining means on the body part of the wheel, said retaining means comprising a plurality of inclined protuberances extending into the interior of the inner portion of the cover and arranged in a common circle so that the intermediate flexible indentation of the cover may be cammed over the protuberances into retaining cooperation therewith.

5. In a wheel structure including a wheel having tire rim and body parts and retaining means on one of said parts, a circular wheel cover of flexible material which is form-sustaining and yet deflectable without permanent deformation, said cover having concentric circular portions connected by a flexible indentation engageable with said retaining means for attaching the cover to the wheel, and a retaining ring pressed into said indentation for deflecting the material at the indentation to shape and fit the cover to accommodate variations in the wheel and to augment the retaining engagement of the cover and retaining means.

6. In a wheel structure including a wheel having tire rim and body parts and retaining means on one of said parts, a circular wheel cover of flexible material which is form-sustaining and yet deflectable without permanent deformation, said cover having concentric circular portions connected by a flexible indentation engageable with said retaining means for attaching the cover to the wheel, and a retaining ring pressed into said indentation for deflecting the material at the indentation to shape and fit the cover to accommodate variations in the wheel and to augment the retaining engagement of the cover and retaining means, the radially outer of said portions being of convex concave configuration and being of such radial depth as to extend clear to the outer edge of the rim whereby said outer portion in use appears to constitute a continuation of the side wall of the tire mounted on a wheel.

7. In a wheel structure including a wheel having tire rim and body parts, a cover comprising concentric convex integral circular portions of flexible material which is form-sustaining and yet deflectable without permanent deformation, one of said portions being adapted to conceal the tire rim parts and the other of said portions being adapted to conceal the body parts, said portions being connected by an integral indentation portion of substantial reentrant depth, one of said wheel parts having cover retaining means thereon adapted to be engaged by said indentation portion for attaching the cover in place on the wheel, and a retaining ring tucked into said indentation and forcing the indentation portion into more secure engagement with said retaining means.

GEORGE ALBERT LYON.

REFERENCES CITED

The following references are of record in the file of this patent:

UNITED STATES PATENTS

| Number | Name | Date |
|---|---|---|
| 2,020,885 | Gatta | Nov. 12, 1935 |
| 2,239,367 | Lyon | Apr. 22, 1941 |
| 2,265,241 | Lyon | Dec. 9, 1941 |

FOREIGN PATENTS

| Number | Country | Date |
|---|---|---|
| 281,869 | Great Britain | Dec. 15, 1927 |
| 264,397 | Italy | Apr. 26, 1929 |